United States Patent [19]
Mattera

[11] Patent Number: 5,915,843
[45] Date of Patent: *Jun. 29, 1999

[54] FLUID-COOLED BEARING HOUSING

[75] Inventor: Ted Mattera, Oakbrook, Ill.

[73] Assignee: The Torrington Company, Torrington, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/947,761

[22] Filed: Oct. 9, 1997

Related U.S. Application Data

[63] Continuation of application No. 08/678,532, Jul. 12, 1996.

[51] Int. Cl.$^6$ ................ F16C 3/14; F16C 3/16; F16C 19/50
[52] U.S. Cl. .............. 384/316; 384/321; 384/476; 384/900
[58] Field of Search ................. 384/467, 476, 384/321, 315, 316, 317, 900

[56] References Cited

U.S. PATENT DOCUMENTS

| | | | |
|---|---|---|---|
| 2,698,773 | 1/1955 | Kaczor | 384/476 |
| 2,836,471 | 5/1958 | Luenberger | 384/467 |
| 3,267,997 | 8/1966 | Matarese et al. | 384/317 |
| 3,853,309 | 12/1974 | Widmer | 384/317 |
| 4,323,286 | 4/1982 | Vohr | 384/317 |
| 4,671,682 | 6/1987 | Yoshihara . | |
| 4,699,524 | 10/1987 | Bath | 384/316 |
| 4,733,977 | 3/1988 | Eisenmann et al. . | |
| 4,883,369 | 11/1989 | Jude et al. . | |
| 5,186,547 | 2/1993 | Muhl et al. . | |

FOREIGN PATENT DOCUMENTS

| | | | |
|---|---|---|---|
| 4050512 | 2/1992 | Japan | 384/476 |
| 0826197 | 12/1959 | United Kingdom | 384/467 |

*Primary Examiner*—John A. Jeffery
*Assistant Examiner*—Matthew A. Kaness
*Attorney, Agent, or Firm*—John C. Bigler

[57] ABSTRACT

A housing segment has a fluid inlet and a fluid outlet and a cooling passage therebetween. The cooling passage has a uniform cross-sectional area approximately equal to the cross-sectional area of the fluid inlet and the fluid outlet and may be conveniently formed in a serpentine configuration with loops extending axially. The bearing housing may be mounted over a rolling element bearing to provide a fluid-cooled housed bearing.

10 Claims, 3 Drawing Sheets

FLUID-COOLED BEARING HOUSING

This application is a continuation of application Ser. No. 08/678,532, filed Jul. 12, 1996.

BACKGROUND OF THE INVENTION

This invention relates generally to bearings using fluid for cooling and, more particularly, to a bearing housing having a chamber for water or other cooling liquid.

Bearings operating in extremely hot conditions such as, but not limited to, continuous caster equipment, require auxiliary cooling in order to prevent the loss or reduced effectiveness of bearing lubricant, generally oil or grease. The usual method to provide this cooling is to mount the bearing in a housing which itself is cooled. Typically, this bearing housing is designed and constructed with a chamber or cavity containing a liquid, usually water or treated water. The liquid flows through the chamber, taking with it the excess heat that has been transferred to the liquid.

One of the problems with such conventional bearing designs is the adhesion of deposits within the chamber. Minerals and foreign matter suspended in the liquid drop out of suspension when the liquid is in the chamber, resulting in deposits that accumulate, solidify and eventually plug the flow of the cooling liquid. The loss of cooling then allows the bearing housing, the bearing itself and the lubricant to overheat. The excessive heat renders the lubricant ineffective and the bearing itself fails. Other problems involve corrosion within the chamber.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a bearing housing for a rolling element bearing, the bearing housing including a housing segment having a fluid inlet and a fluid outlet and a cooling passage therebetween. The cooling passage has a uniform cross-sectional area approximately equal to the cross-sectional area of the fluid inlet and the fluid outlet.

In another aspect of the invention, this is accomplished by providing a fluid-cooled housed bearing comprising a rolling element bearing and a housing segment mounted over the rolling element bearing. The housing segment has a fluid inlet and a fluid outlet and a cooling passage therebetween with a cross-sectional area approximately equal to the cross-sectional area of the fluid inlet and the fluid outlet.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
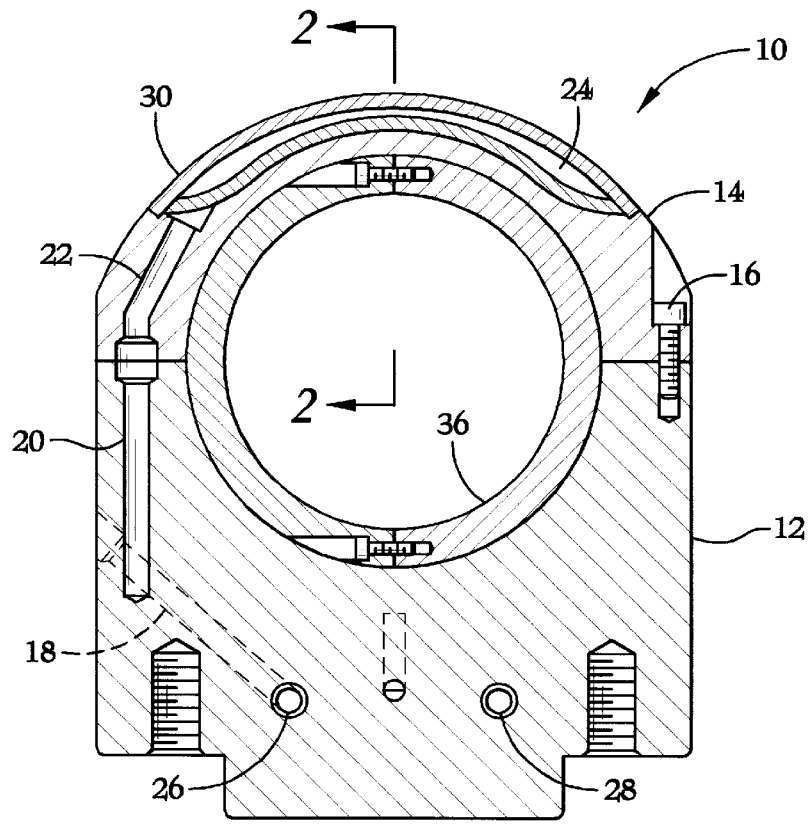
FIG. 1 is a sectional view of a fluid-cooled housed bearing according to the prior art.

Referring now to the drawings, FIG. 1 illustrates fluid-cooled housed bearing 10, according to the prior art, comprising lower housing segment 12 and upper housing segment 14, joined by cap screws 16. Passageways 18, 20 and 22 within the bearing housing connect chamber 24 within upper housing segment 14 with inlet fitting 26, and similar passageways (not shown) connect chamber 24 with outlet fitting 28. Housing cover plate 30 is welded over upper housing segment 14 to cover chamber 24 and complete the circuit for the cooling fluid.

Figure 2:
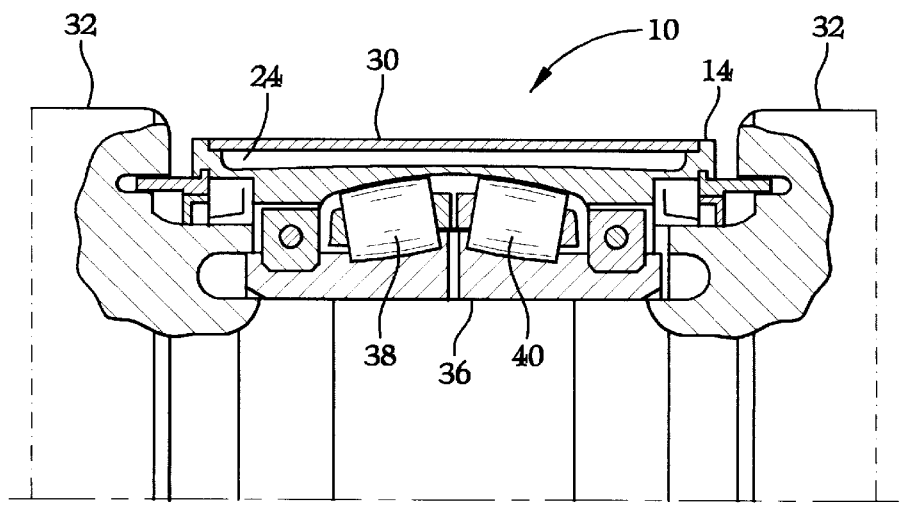
FIG. 2 is an enlarged cross-sectional view of the fluid-cooled housed bearing of FIG. 1, along the line 2—2, in a continuous caster application.
Figure 3:
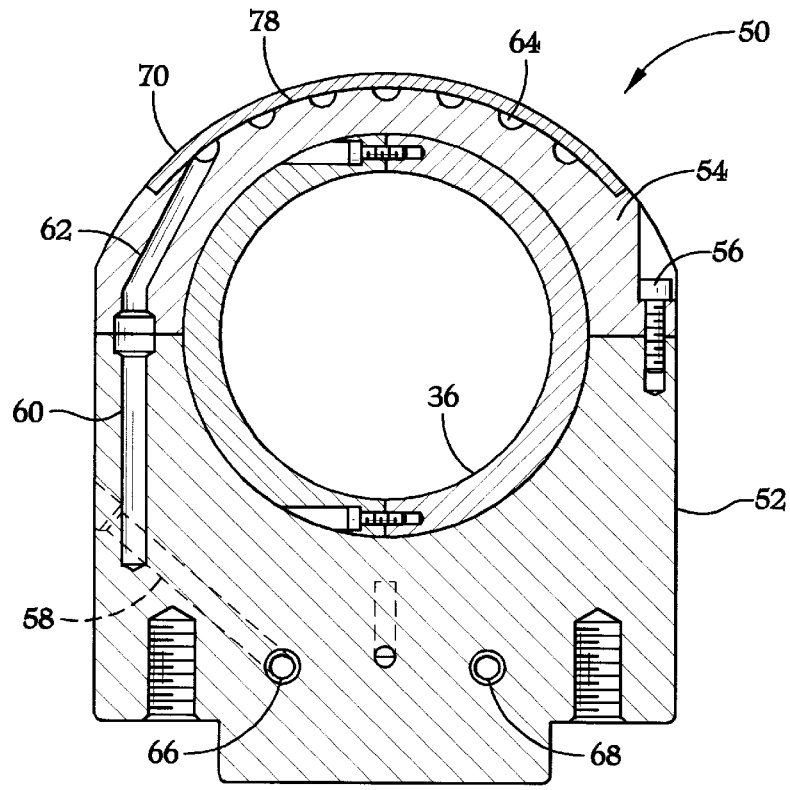
FIG. 3 is a sectional view of a fluid-cooled housed bearing according to the present invention.

FIG. 2 illustrates fluid-cooled housed bearing 10 in a continuous caster application with mill roll 32 supported on inner bearing ring 36. The illustrated housed bearing has rows 38 and 40 of spherical rollers. Chamber 24 extends axially the length of upper housing 14 and is irregularly shaped with deeper portions at the axial ends and at the lateral ends so that capacity of the chamber is increased, allowing additional cooling fluid to be contained adjacent rows 38 and 40 of spherical rollers.

Figure 4:
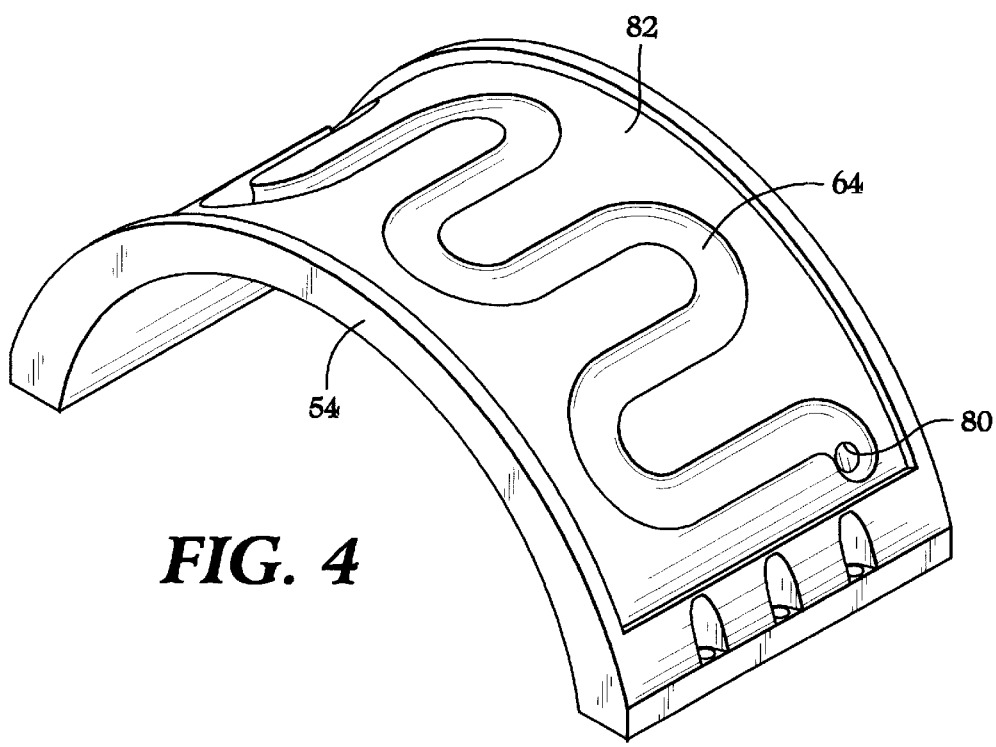
FIG. 4 is an enlarged pictorial view of the upper housing segment of FIG. 3, with cover plate removed.
Figure 5:
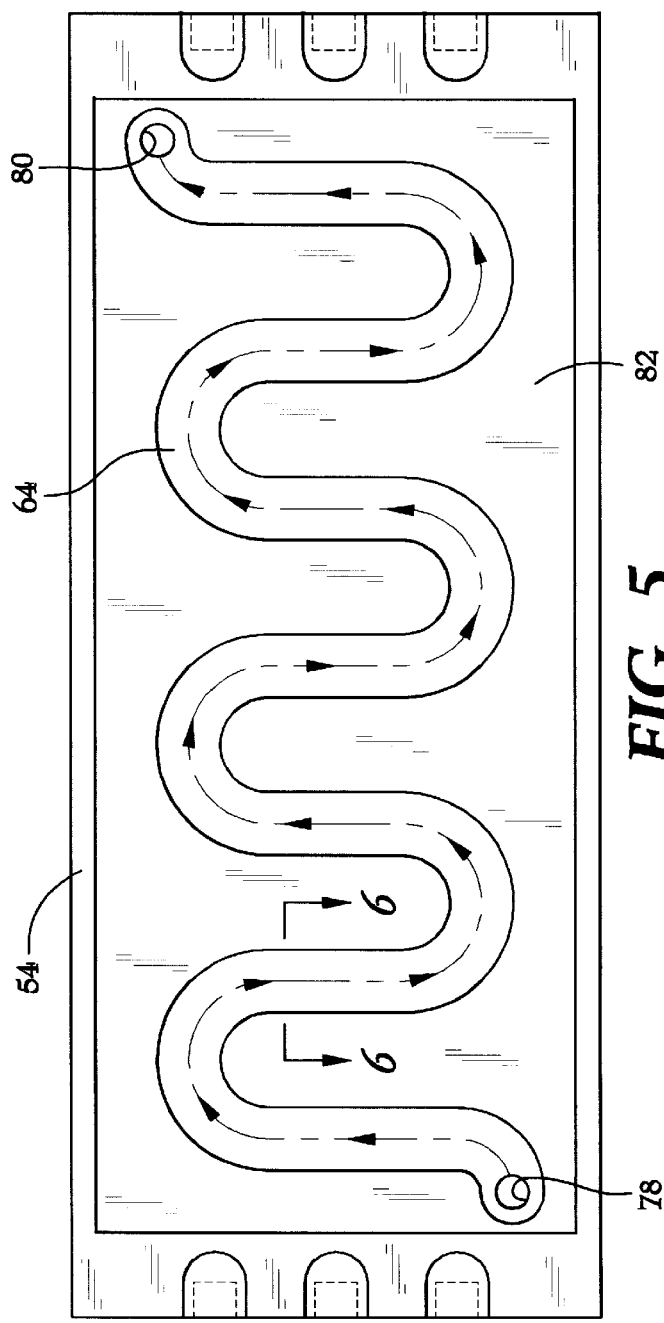
FIG. 5 is a development of the upper housing segment of FIG. 4, with arrows indicating the flow of cooling liquid.

FIGS. 3 through 6 illustrate fluid-cooled housed bearing 50, according to the present invention, comprising lower housing segment 52 and upper housing segment 54, joined by cap screws 56. Passageways 58, 60 and 62 within the bearing housing connect cooling passage 64 with inlet fitting 66 and outlet fitting 68. Housing cover plate 70 is mounted over upper housing segment 54 by welding or other means to enclose cooling passage 64. As illustrated in FIG. 4, cooling passage 64 may have a serpentine configuration. The shape of the passage may form an "S" or "W" or any other convenient shape to distribute cooling fluid over the surface of upper housing segment 54.

Figure 8:
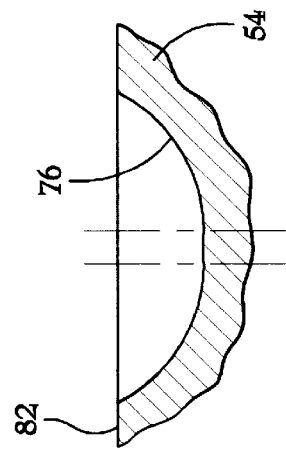
FIG. 8 is a sectional view similar to FIG. 6 illustrating a second alternative groove for the upper bearing housing of FIG. 4.
Figure 7:
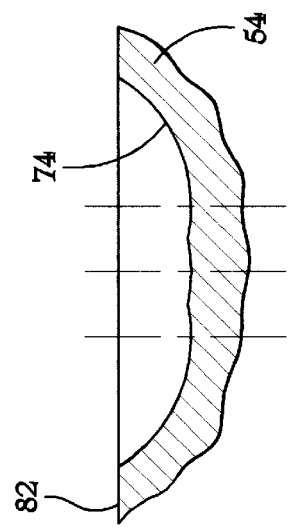
FIG. 7 is a sectional view similar to FIG. 6 illustrating an alternative groove for the upper housing segment of FIG. 4.
Figure 6:
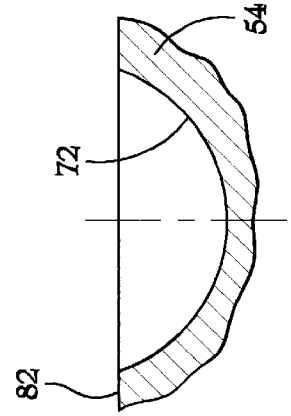
FIG. 6 is a sectional view of the upper housing segment of FIG. 5, along the line 6—6.

As shown in FIG. 6, the illustrated embodiment may be conveniently formed by a half-round shaped rounded groove 72 machined into the radially outer surface of upper housing segment 54. If a more shallow passage or a passage with steeper side walls is desired, multiple overlapping rounded grooves may be machined to provide shallow grooves 74 and 76, illustrated in FIGS. 7 and 8, respectively. In addition, cooling passage 64 may be formed by casting or other methods and may be of square, rectangular or other cross-section without departing from the present invention. Housing cover plate 70 may be recessed as shown or may be mounted over upper housing segment 54, extending radially outward therefrom.

Significantly, the cross-sectional area of cooling passage 64 should be approximately equal to the cross-sectional area of fluid inlet 78 and fluid outlet 80, dependent somewhat on the shape of the cooling passage, such that the cooling fluid moves at approximately the same velocity throughout the bearing housing. By not allowing the velocity to drop, the minerals and foreign matter remain suspended while passing through the bearing housing. This keeps the passage free and clear of deposits, allowing the fluid-cooled bearing to function properly for longer periods of time than conventional fluid-cooled bearing housings, or indefinitely.

In prior art fluid-cooled bearing housings such as those of FIGS. 1 and 2, for example, flow of cooling fluid is turbulent and creates "dead spots" within the cooling chamber. It is believed that such "dead spots" are initiation points for corrosion buildup. Such corrosion severely affects cooling performance and can lead to bearing failure. The cooling passage of the present invention is configured with a uniform cross-section to avoid turbulent flow, improve cooling efficiency, and reduce corrosion deposits. As a result, there is less need for nickel plating or other coating to combat corrosion.

In addition to improved resistance to deposits, the present invention retains a greater mass of metal and provides ribs, adding strength to the bearing housing. Also, unlike conventional housed bearing 10, the radially outward surfaces of upper housing segment 54, such as for example dividing portions 82, provide a support surface for cover plate 70. The housing segment with cooling passage 64 may be in various orientations (upper, lower, left, right, etc.) and may include an outer raceway as illustrated in FIG. 2 or may be mounted over a separate outer bearing ring.

The present invention is versatile and is not limited to continuous caster applications, to spherical roller bearings, or to bearings having particular seals or other features illustrated in FIG. 2. The housing may be split, with two (or more) housing segments as illustrated, or may be a single piece housing. The term housing segment is used throughout this description and the claims to refer to an element of either a single piece housing or a split housing.

Having described the invention, what is claimed is:

1. A fluid-cooled bearing housing for a rolling element bearing, the bearing housing comprising:
    a housing segment having a fluid inlet and a fluid outlet with a cross-sectional area and a cooling passage therebetween, the cooling passage having a serpentine configuration formed by rib portions defining an open groove in a radially outward surface of the housing segment such that the rib portions add strength to the housing segment and provide support for a cover plate; and
    a cover plate mounted over the rib portions of the housing segment and covering the open groove such that the cooling passage has a closed uniform cross-sectional area approximately equal to the cross-sectional area of the fluid inlet and the fluid outlet.

2. The fluid-cooled bearing housing according to claim 1, wherein the cooling passage has a serpentine configuration with loops extending axially with respect to the rolling element bearing.

3. The fluid-cooled bearing housing according to claim 1, wherein the groove is formed in the housing segment so as to provide a closed "S" shaped path when the cover plate is mounted over the housing segment.

4. The fluid-cooled bearing housing according to claim 1, wherein the cooling passage has a cross-section having a size and shape such that cooling fluid flowing through the cooling passage will maintain a constant velocity.

5. A fluid-cooled housed bearing comprising:
    a rolling element bearing;
    a housing segment mounted over the rolling element bearing, the housing segment having a fluid inlet and a fluid outlet with a cross-sectional area and a cooling passage therebetween, the cooling passage having a serpentine configuration formed by rib portions defining an open groove in a radially outward surface of the housing segment such that the rib portions add strength to the housing segment and provide support for a cover plate; and
    a cover plate mounted over the rib portions of the housing segment and covering the open groove such that the cooling passage has a closed cross-sectional area approximately equal to the cross-sectional area of the fluid inlet and the fluid outlet.

6. The fluid-cooled housed bearing according to claim 5, wherein the cooling passage has a serpentine configuration with loops extending axially with respect to the rolling element bearing.

7. The fluid-cooled housed bearing according to claim 5, wherein the groove is formed in the housing segment so as to provide an enclosed "S" shaped path when the cover plate is mounted over the housing segment.

8. The fluid-cooled housed bearing according to claim 5, wherein the housing segment includes a recess for the cover plate and the cover plate is welded in the recess such that the cover plate is flush with the radially outward surface of the housing segment.

9. The fluid-cooled housed bearing according to claim 5, wherein the cooling passage has a cross-section having a size and shape such that cooling fluid flowing through the cooling passage will maintain a constant velocity.

10. The fluid-cooled housed bearing according to claim 5, wherein the housing segment encircles the rolling element bearing as a single piece housing.

* * * * *